No. 664,469. Patented Dec. 25, 1900.
J. S. COPELAND.
JOINT FOR VEHICLE FRAMES.
(Application filed May 20, 1897.)
(No Model.)

Witnesses:
Wm H. Barker
Emma P. Coffin

Inventor:
James S. Copeland
by Chas. L. Burdett,
attorney.

THE NORRIS PETERS CO., PHOTO-LITHO., WASHINGTON, D. C.

UNITED STATES PATENT OFFICE.

JAMES S. COPELAND, OF HARTFORD, CONNECTICUT, ASSIGNOR TO THE AMERICAN BICYCLE COMPANY, OF JERSEY CITY, NEW JERSEY, AND NEW YORK, N. Y.

JOINT FOR VEHICLE-FRAMES.

SPECIFICATION forming part of Letters Patent No. 664,469, dated December 25, 1900.

Application filed May 20, 1897. Serial No. 637,405. (No model.)

*To all whom it may concern:*

Be it known that I, JAMES S. COPELAND, a citizen of the United States, and a resident of Hartford, in the county of Hartford and State of Connecticut, have invented certain new and useful Improvements in Joints for Vehicle-Frames, of which the following is a full, clear, and exact description, whereby any one skilled in the art can make and use the same.

One object of my invention is to provide means whereby a vehicle-frame, and more particularly a frame for a bicycle, made up of brackets and tubular members, may be constructed with fastening devices which will enable the frame, that may have a reinforce $a'$, to be assembled and firmly united as to the several component parts, while permitting the use of tempered steel tubes, if desired; and a further object is to provide a frame of this class which may be readily assembled and as easily taken apart.

To this end my invention consists in the features of the several parts comprising the frame as a whole and the combination of the parts, as hereinafter described and more particularly pointed out in the claims.

Figure 1:
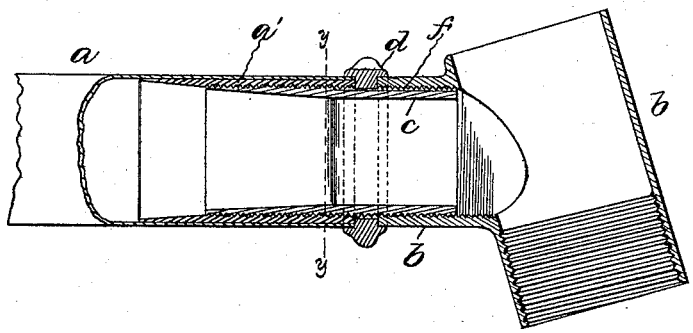
Figure 2:
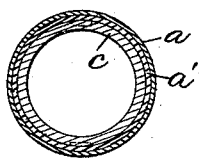
Figure 3:
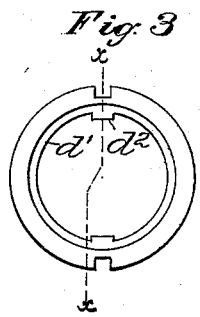

Referring to the drawings, Figure 1 is a view in side elevation of part of the top frame-tube of a bicycle and in section on line $x\ x$ of Fig. 3 of the brackets to which this tube is secured. Fig. 2 is a detail view in cross-section through the coupling means on line $y\ y$ of Fig. 1. Fig. 3 is a detail edge view of the coupling-collar.

The within invention is described in connection with the frame of a bicycle, as it is particularly, although not solely, adapted for use in connection with the frame of such a light vehicle, and in such frame the several tubular members are united by brackets, the respective parts being firmly held together by interengaging threaded parts. The screwing together of the several component parts which are threaded to fit each other at the proper points is a feature of construction on which my improvement is based.

In the accompanying drawings the letter $a$ denotes a tubular member of the frame and $b$ a bracket member, the latter being provided with a tang $b'$, threaded to receive and engage the threaded portion of a coupling device.

In putting together or assembling the several tubular and bracket members of a frame which is united by threaded parts as opposed to brazing or pinning and brazing as a means of fastening such parts together it is difficult to provide for the exact relative adjustment and alinement of the members in the desired central plane of the frame. It can be done by repeated cutting and fitting of the abutting ends or shoulders; but this is undesirable as a requirement of shop practice for obvious reasons. To provide for and avoid this difficulty of adjustment of the connected members of the frame in the proper plane and yet secure the firm bearing of the shoulders, I make use of a threaded coupling $c$, which fits within or upon the end of the tubular member and the tang on the bracket member and by its rotation serves to control the relative adjustment and distance apart of the members which it unites. With the coupling $c$ located inside the parts, as shown herein, the collar $d$, with a central web $d'$ projecting inward between the end of the tube and of the tang on the bracket, is used. The diameter of the opening through the web of the collar is such as to enable it to fit snugly upon the coupling and yet have free lateral movement thereon. A lug $d^2$ on the inner edge of the web $d'$ projects into a lengthwise slot $f$ in the outer surface of the coupling, so as to hold the collar against rotation except with the coupling, but allows free lengthwise movement of said parts independent of each other, and openings $e$ in the periphery of the collar form an anchorage for a spanner or like tool, by means of which the collar may be rotated to bring the tube and bracket into proper relation. This means of adjustment is of special value in assembling a frame in which one or more of the tubular members is crooked or bent.

It is obvious that the threads on each end of the coupling shall extend in a different direction from that on the other end or that said threads shall be of opposite or varying pitch in order to constitute an operative device; but I prefer to construct the threads of opposite pitch.

In the form of collar $d$ shown in the drawings, in which the central web $d'$ is less in width than the collar, as seen in cross-section, shoulders are provided, underneath which the end of the tang on the one side and of the frame member on the other side project. When these two parts of the frame are drawn firmly together, the overhanging edges of the collar hold the tube end from flaring under the strain of the end thrust or of a twisting force, and a further advantage is that this construction of the collar serves to keep out dust and dirt.

The term "varying" is used in the claims herein to denote the difference in construction of the threads on opposite ends of the coupling or on the tang and tube member, this term indicating that difference in which the threads on one end are coarser than those on the opposite end or in which the threads on one end extend in a different direction from those on the opposite end.

I claim as my invention—

1. In combination in a vehicle-frame, a tubular member and a bracket member having threaded sockets, a threaded coupling fitting said sockets and having a lengthwise slot, the threads on the opposite ends of the coupling being of varying pitch, and a collar loosely mounted on the coupling and having a lug projecting into the slot in the coupling, all substantially as described.

2. In combination in a vehicle-frame, a tubular member and a bracket member each having a threaded socket fitting a thread on a coupling, the threaded coupling fitting said sockets and having a peripheral slot, the threads on the opposite ends of the coupling being of varying pitch, and a collar loosely mounted on the coupling with a lug engaging the slot in the coupling-sleeve and an overhanging edge beneath which the end of the tubular member projects, all substantially as described.

JAMES S. COPELAND.

Witnesses:
CHAS. L. BURDETT,
ARTHUR B. JENKINS.